(12) United States Patent
Migault et al.

(10) Patent No.: US 7,941,517 B2
(45) Date of Patent: May 10, 2011

(54) SERVER AND METHOD FOR MANAGING DNSSEC REQUESTS

(75) Inventors: Daniel Migault, Issy les Moulineaux (FR); Jean-Michel Combes, Issey les Moulineaux (FR); Anne-Sophie Duserre, Courbevoie (FR)

(73) Assignee: France Telecom, Paris (FR)

( * ) Notice: Subject to any disclaimer, the term of this patent is extended or adjusted under 35 U.S.C. 154(b) by 8 days.

(21) Appl. No.: 12/087,323

(22) PCT Filed: Dec. 19, 2006

(86) PCT No.: PCT/FR2006/051383
§ 371 (c)(1),
(2), (4) Date: Dec. 23, 2008

(87) PCT Pub. No.: WO2007/074286
PCT Pub. Date: Jul. 5, 2007

(65) Prior Publication Data
US 2009/0187649 A1    Jul. 23, 2009

(30) Foreign Application Priority Data
Dec. 27, 2005  (FR) ..................... 05 54101

(51) Int. Cl.
*G06F 15/16* (2006.01)
*G06F 12/00* (2006.01)
(52) U.S. Cl. ....................... 709/223; 713/152
(58) Field of Classification Search .......... 709/236–239, 709/245–246, 217–218, 223–225; 713/152
See application file for complete search history.

(56) References Cited

U.S. PATENT DOCUMENTS

| | | | |
|---|---|---|---|
| 2004/0039798 A1* | 2/2004 | Hotz et al. | 709/219 |
| 2004/0044791 A1* | 3/2004 | Pouzzner | 709/245 |
| 2004/0215707 A1* | 10/2004 | Fujita et al. | 709/201 |
| 2004/0249971 A1* | 12/2004 | Klinker | 709/239 |
| 2004/0254926 A1* | 12/2004 | Balogh | 707/4 |

OTHER PUBLICATIONS

Mocapetris, P., "Domain Names—Concepts and Facilities", RFC 1034, pp. 1-49, Nov. 1987.
Arends, R., "DNS Security Introduction and Requirements", RFC 4033, Mar. 2005, pp. 1-19.
Arends, R., "Resource Records for the DNS Security Extensions", RFC 4034, pp. 1-26, Mar. 2005.
R. Arends et al, " Protocol Modifications for the DNS Security Extensions; rfc4035.txt", IETF Standard, Internet Engineering Task Force, XP015041964, Mar. 2005.

(Continued)

*Primary Examiner* — Zarni Maung
(74) *Attorney, Agent, or Firm* — Cohen Pontani Lieberman & Pavane LLP

(57) ABSTRACT

A domain server that comprises: means (10) for receiving a query transmitted from a client device (CL1) for obtaining DNS data; a zone file (FZ1, zone) comprising one or more distribution rules defining a partitioning of the domain into sub-zones, DNS data of said sub-zones being associated with a pair of partition keys specific to said sub-zone; means (20) for obtaining from said zone file a useful piece of information sufficient for identifying the pair of the partition keys associated with the required DNS data; and means (10) for transmitting to the client device (CL1): the required DNS data, the value of the signature of said data produced by means of the private component (ZSK2[pr]) of the pair of partition keys; and the useful piece of information.

14 Claims, 2 Drawing Sheets

OTHER PUBLICATIONS

S. Weiler, Clarifications and Implementation Notes for DNSSECbis; draft-ietf-dnsext-dnssec-bis-updates-01.txt, IETF Standard-Working-Draft, Internet Engineering Task Force, XP015041290 section 4.2, May 23, 2005.

M. Gieben, "DNSSEC: The Protocol, Deployment and a Bit of Development", The Internet Protocol Journal, CISCO Systems Inc., vol. 7, No. 2, Jun. 2004, pp. 17-27.

* cited by examiner

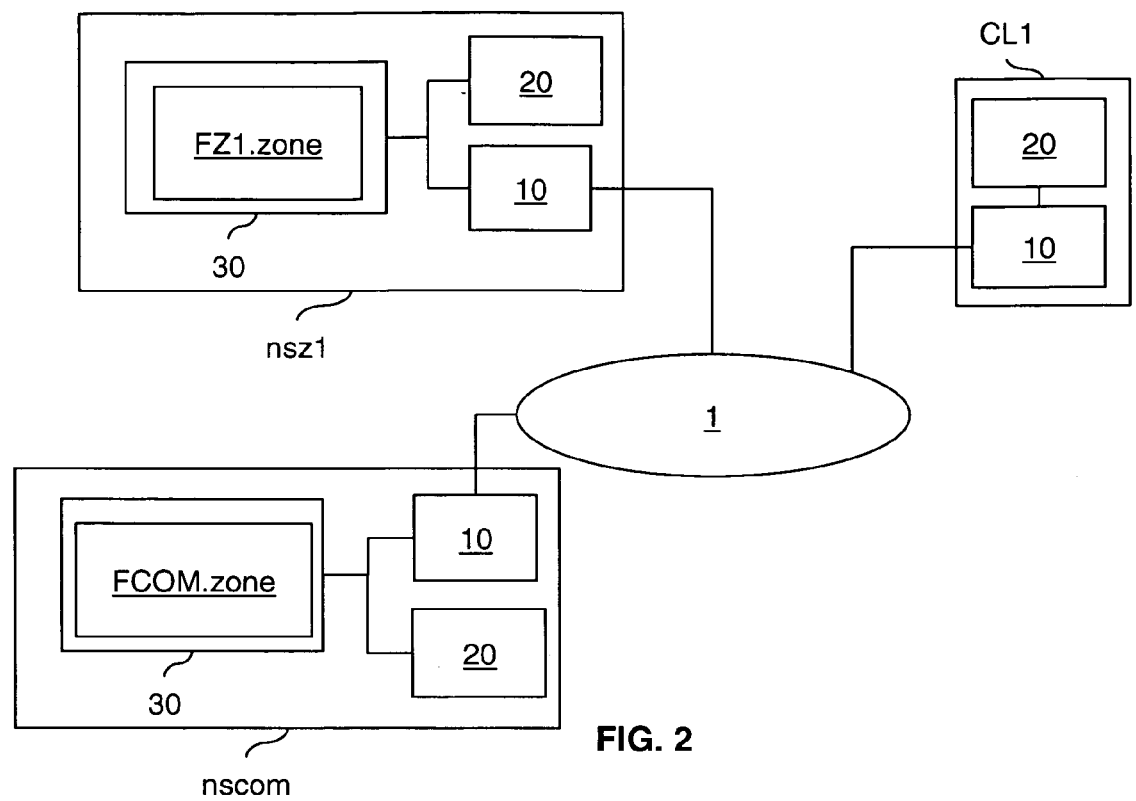
FIG. 2
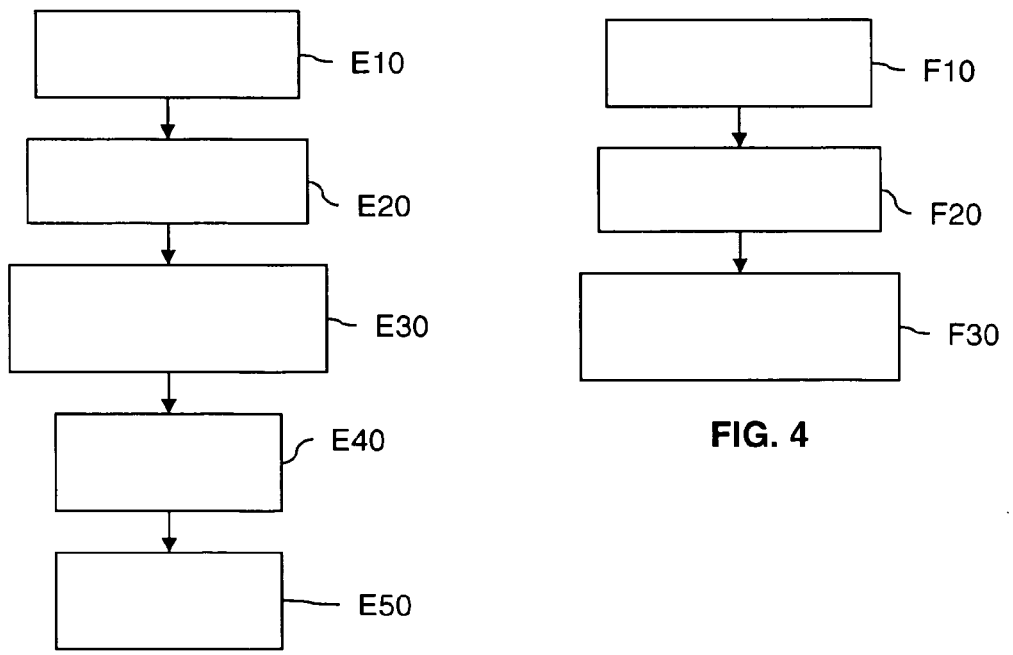
FIG. 3
FIG. 4

SERVER AND METHOD FOR MANAGING DNSSEC REQUESTS

RELATED APPLICATIONS

This is a U.S. National Phase Application under 35 USC 371 of International Application PCT/FR2006/051383, filed on Dec. 19, 2006.

This application claims the priority of French application no. 05/54101 filed Dec. 27, 2005, the entire content of which is hereby incorporated by reference.

FIELD OF THE INVENTION

The present invention relates to the general field of domain servers (also known as "domain name servers") used in telecommunications networks.

BACKGROUND OF THE INVENTION

Domain names in a network are managed by the Domain Name System (DNS) architecture defined by Request For Comments (RFC) 1034 issued by the Internet Engineering Task Force (IETF).

That architecture introduces the concept of a "domain", consisting of a group of machines in the network.

FIG. 1 shows such an architecture. The domains ., .fr, .com, ft.com, and rd.ft.com contain sub-domains.

For example, the domain ft.com includes three sub-domains user.ft.com, rd.ft.com, and www.ft.com.

The domains that are underlined in FIG. 1 are known as "terminal domains". A terminal domain can represent one or more physical machines, which is the case of the terminal domain www.rd.ft.com, for example, which in this example is a web server, but can also not represent a physical machine, which is the case of the terminal domain user.ft.com, for example, which in this example consists of personal information of the user denoted "user".

A domain that includes one or more sub-domains is associated with a domain server.

That domain server includes a zone file.

Domains are logically interlinked so that DNS data of any domain can be obtained by submitting queries to the name servers progressively (in other words, from "parent" to "child"), beginning with the root server.

The "DNS data" referred to in RFC 1034 can in particular represent an IP (Internet Protocol) address of a domain, a text, or any field associated with a domain.

Unfortunately, the DNS architecture has certain security weaknesses.

For example, when a user logs onto a website to effect a banking transaction, there is no way to be sure that he is actually connected to the required site, rather than to a pirate site attempting to obtain their banking information by fraud.

IETF RFC 4033, RFC 4034 and RFC 4035 define a secure extension of the DNS protocol, known as the "DNSSEC" protocol. Returning to the previous scenario, the DNSSEC protocol guarantees that users are actually connected to the required website.

To be more precise, the DNSSEC protocol guarantees the integrity of DNS data by using signatures to encrypt it.

Thus a domains managed by a domain name server is characterized by a pair of public key/private key pairs denoted ZSK (Zone Signing Key); the public and private components of this pair are respectively denoted ZSK[pu] and ZSK[pr]. A user who has submitted a query to a DNS server using the DNSSEC protocol to obtain DNS data (referred to generically as RR DATA) receives in return from the server the required data RR DATA and the value of the RR DATA signature effected by means of the private key ZSK[pr].

A user can in particular submit a "KEY" query. Under such circumstances, as described above, the user obtains the key ZSK[pu] in clear and the value of the signature produced using the private key ZSK[pr]; however, the user also receives the public component KSK[pu] of a key pair denoted KSK (Key Signing Key) and the value of the signature of the keys ZSK[pu] KSK[pu] produced by means of the private component KSK[pr] of this KSK pair. By submitting queries to the "parent" domain of the domain concerned, users can authenticate the key KSK[pu] and consequently authenticate the key ZSK[pu] which, in the end, enables them to verify the signature of any DNS data from the domain concerned.

The DNSSEC protocol therefore establishes a chain of trust in the hierarchy of domains.

Conventional implementation of this protocol has the drawback that the operation of signing all the DNS data of a given domain is costly for the domain manager in terms of resources. Moreover, on renewing a ZSK pair, the signatures of all the data signed with the key ZSK[pr] must also be renewed, which is very costly in terms of computation time.

SUMMARY OF THE INVENTION

One object of the invention is to provide a solution for simplifying and facilitating calculation of data signatures managed by a domain name server.

To this end, a first aspect of the invention is directed to a domain server in a telecommunications network, adapted to manage DNSSEC queries relating to said domain, including means for receiving from a client device a query seeking DNS data of that domain.

This server includes:
  a zone file including one or more distribution rules defining a partitioning of said domain into a plurality of sub-zones, the DNS data of each sub-zone being associated with a pair of keys, referred as "partition keys", specific to that sub-zone;
  means for obtaining from said zone file a useful piece of information sufficient to identify the partition key pair associated with the required DNS data; and
  means for sending said client device, in response to said query:
    the required DNS data;
    the value of the signature of that data produced using the private component of said associated partition key pair; and
    said piece of information.

Generally speaking, the term "zone" designates all data hosted on a server and the term "domain" designates the logical entity. However, the terms "zone" and "domain" are often used interchangeably in the literature.

The name server of the invention therefore partitions a domain into sub-zones, a pair of keys being allocated independently to each sub-zone.

In particular, keys of different lengths can be allocated to different partitions. Thus data associated with more sensitive domains can be signed with longer keys, at the cost of increasing the computation time needed for effecting the signature.

These partitions can be physically located on the same server or not.

By means of the invention, management of a zone can be dedicated to a number of different administrative entities responsible for choosing the keys used to sign data and the renewal rules for each sub-zone. The prior art uses a number of signature keys within a zone, and the key used is specified in each signature. With the invention, where the signature operations are concerned, a zone can be independently partitioned into managed sub-zones, simplifying the task of the main server. The DNS server of the invention then establishes a trust chain with its partition (which is indispensable in that the keys are often somewhere other than the DNS server). During key updating operations, fields whose signature must be renewed can be determined directly without having to examine all the data of the zone file.

An embodiment of the invention involves the zone file read by the server. Thus a second aspect of the invention is a data structure consisting of a computer file that can be read by a domain server in a telecommunications network.

That computer file contains one or more distribution rules defining a partitioning of said domain into a plurality of sub-zones, the DNS data of each of the sub-zones being associated with a "partition key pair" specific to that sub-zone, said distribution rule enabling a useful piece of information to be obtained sufficient to identify which partition key pair is associated with any data selected from said DNS data of the domain.

In practice, the administrator of a zone defines the logical partitioning of that zone, which amounts to dividing the sub-zones of the domain into different groups each characterized by the keys for encrypting its data.

The computer file of an embodiment of the invention therefore primarily comprises a list of identifiers of signature key pairs and a distribution rule for identifying a key pair associated with the required DNS data.

The useful piece of information sent back by the server to redirect its client can be of different types.

For example, it can include an item among:
  the public component of said associated partition key pair; and
  said one or more distribution rule, together with the public components of all the partition keys.

For example, if the useful information is the distribution rule, the client device or its administrator must interpret the distribution rule to determine the key pair whose private component was used to sign the data.

Accordingly, and more generally, a third aspect of the invention is directed to a data processing system client of a domain name server in a telecommunications network, including means for sending the server a DNSSEC query seeking DNS data of that domain.

This data processing system includes means for interpreting information received in response to said query, this information enabling it to identify which key of a plurality of keys, referred as "public partition keys", corresponds to a private key that was used to sign said DNS data.

In a preferred embodiment, the distribution rule for identifying the pair of keys is a regular expression.

A regular expression can be defined as a line of computer code commanding a search for a pattern within a string of characters.

According to particular features, the domain name server includes means for interpreting the regular expression, obtaining the appropriate public key, and sending it to the client device.

This particularly advantageous feature greatly facilitates the task of users who do not have a client device adapted to interpret regular expressions.

In a correlated way, another aspect of the invention relates to a method of managing DNSSEC queries relating to a domain in a telecommunications network, including a step of receiving from a client device a query seeking DNS data of that domain.

This method also includes:
  a step of reading a zone file containing one or more distribution rules defining a partitioning of the domain into a plurality of sub-zones, the DNS data of each sub-zone being associated with a pair of keys, referred as "partition keys" specific to said sub-zone;
  a step of obtaining from the zone file a piece of information sufficient to identify the partition key pair associated with the required DNS data; and
  a step of sending the client device, in response to the query:
    the required DNS data;
    the value of the signature of that data produced using the private component of the associated partition key pair; and
    the useful piece of information.

Another aspect of the invention is directed to a method of obtaining DNS data of a domain in a telecommunications network, that method including a step of sending a DNSSEC query aiming to obtain the DNS data.

This method also includes a step of interpreting a useful piece of information received in response to the aforementioned query, in order to identify which key among a plurality of keys referred as "public partition keys" corresponds to a private key that was used to sign the required DNS data.

In a preferred embodiment, the various steps of the management method and the obtaining method are determined by computer program instructions.

Another aspect of the invention is directed to computer programs on an information medium, which programs can be executed in a computer, a domain name server or in a client device and comprise instructions for executing the above domain name management method or the above method of obtaining data.

These programs can use any programming language and take the form of source code, object code or an intermediate code between source code and object code, such as a partially compiled form, or any other desirable form.

Another aspect of the invention is directed to an information medium readable by a computer or a domain name server and including instructions of a computer program as referred to above.

The information medium can be any entity or device capable of storing the program. For example, the medium can include storage means, such as a ROM, for example a CD ROM or a microelectronic circuit ROM, or magnetic storage means, for example a floppy disk or hard disk.

Moreover, the information medium can be a transmissible medium such as an electrical or optical signal, which can be routed via an electrical or optical cable, by radio or by other means.

The program of the invention can in particular be downloaded via an Internet type network.

Alternatively, the information medium can be an integrated circuit into which the program is incorporated, the circuit being adapted to execute the method in question or to be used in its execution.

BRIEF DESCRIPTION OF THE DRAWING

Appendix 1 represents the principal lines of a zone file of a parent domain name server conforming to the DNSSEC protocol;

Appendices 2-1 and 2-2 represent the principal lines of a zone file of a child domain name server conforming to a preferred embodiment of the invention;

FIG. 2 shows a telecommunications network in accordance with a preferred implementation of the invention including a parent domain name server and a child server;

FIG. 3 is a flowchart showing the main steps of a preferred implementation of a method of the invention for managing domain names; and FIG. 4 is a flowchart showing the main steps of a preferred implementation of a method in accordance with the invention for obtaining DNS data.

DETAILED DESCRIPTION OF THE DRAWINGS

Figure 1:
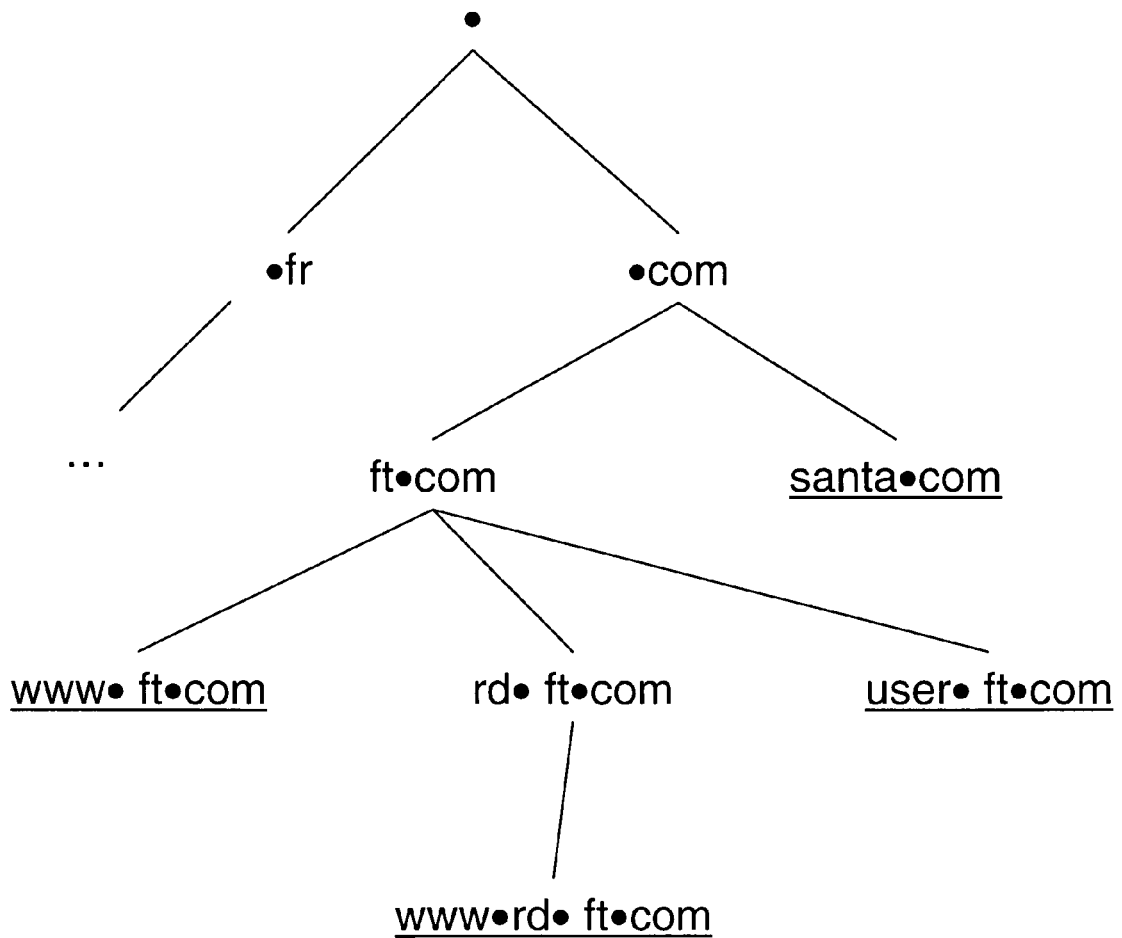
FIG. 1, described above, shows one example of a tree of DNS domains known to the person skilled in the art.

FIG. 2 shows a telecommunications network 1 to which are connected a domain name server nscom managing a zone .com, a domain name server nsz1 managing a zone z1.com, and a client device CL1 able to send a query to either of these domain name servers to obtain data DNS RR DATA associated with a domain.

FIG. 2 shows, for the client device CL1 and for each of the domain name servers nscom and nsz1, means 10 for receiving and sending data over the telecommunications network 1, consisting for example of a network card associated with drivers running the HyperText Transfer Protocol (http) and standard computer processor means 20, in particular a processor, a memory containing computer programs, and a random-access memory for temporarily storing variables necessary for executing the programs.

The processor means 20 of the child server nsz1 execute the instructions of a computer program that executes the main steps E10 to E50 of the management method of the invention represented in FIG. 3.

Similarly, the processing means 20 of the client device CL1 execute the instructions of a computer program that execute the main steps F10 to F30 of the method according to the invention for obtaining data represented in FIG. 4.

It is assumed that, in the step F10, and using the communication means 10, the client device CL1 sends a query to the domain name server nscom at IP address 10.193.161.50 to obtain RR DATA of the domain machine.z1.com. This domain machine.z1.com is part of a sub-zone in the sense of the invention, called "p1" (see appendix 2-2, line 25), but note that the client CL1 does not need to know this when it formulates its query.

By way of example, this query can be of the following type:
dig@10.193.161.50 +norecurse machine.z1.com,
where dig denotes the "Domain Information Groper" tool familiar to the person skilled in the art for submitting queries to domain name servers in the DNS architecture.

This query is received in the step E10 by the receiver means 10 of the domain name server nscom.

The person skilled in the art will recognize that, because the dig command includes no type, the data the client is seeking is data of type A, namely the IP address of the domain machine.z1.com.

During a step E20 following the step E10 of receiving the query from the client CL1, the name processor means 20 of the server nscom read the zone file FCOM.zone (using the DNSSEC protocol), which defines how the server nscom manages the zone ".com".

This zone file FCOM.zone can be stored in a memory 30 of the server nscom, for example, or in another machine.

The main lines of this zone file FCOM.zone are set out in appendix 1.

To be more precise, we focus on the trust chain from the domain ".com" to the sub-domain "z1.com".

The person skilled in the art will recognize that the pairs of keys used to sign the data of the domain ".com" are respectively ZSK_com and KSK_com. Accordingly, as known in the art, the private key of the pair ZSK_com is used to sign all the RR SET fields hosted by the server nscom.

In particular, line L5 has between square brackets the value of the signature of the field SOA with the private key of the pair ZSK_com. To simplify this appendix, the signatures have been replaced with ellipses, thus " . . . ".

As is known in the art, the Start Of Authority (SOA) field contains information relating to management of the zone file hosted by the server, such as the coordinates of the administrator of the server and parameters for updating the zone file.

As is known in the art, to ensure continuity in the DNSSEC security chain, the field DS in line L16 of appendix 1 effects a link between the domain ".com" and a child domain.

In the example described here, "[KSK_z1] " (see line L16) is the result of applying the hashing function of the public key of the pair KSK_z1 of the child domain "z1.com". All data in the domain ".com", and in particular DS type data (see line L17), is signed with the private key of the pair ZSK_com.

The client CL1 seeking the IP address of the domain machine.z1.com, the name server nscom, which does not know the response, sends it, in response to the query, the name (nsz1.z1.com) of the domain name server managing the domain z1.com, the IP address (10.193.161.73) of that server, and the signatures corresponding to type A data (designating the "IP address" type) and type NS data (designating the "domain name server name" type), this signature being produced using the private key of the pair ZSK_com (see lines L12 to L15).

The client device CL1 therefore obtains this IP address (step F20) and can be sure of its integrity following decryption of the data signed by means of the public key of the pair ZSK_com. The record DS (see lines L16 and L17) gives him the "hash" (condensate) of the public component of the pair KSK_z1. The integrity of the record DS is checked by verifying the signature produced using the private component of the pair ZSK_com.

Then, to obtain the IP address of the domain machine.z1.com (by repeating the step F10), the client device CL1 sends a query to the domain name server at the IP address 10.193.161.73 (i.e. the server nsz1).

The client obtains the public component of the pair KSK_z1, enabling it to verify that its "hash" is identical to the "hash" obtained previously in the field DS. The public component of the pair ZSK_z1 is signed with the private component of the pair KSK_z1, which establishes the trust chain.

This query is received in the step E10 by the receiver means 10 of the domain name server nsz1.

Following the step E10 of receiving this query, during the step E20, the name processing means 20 of the server nsz1 read the file FZ1.zone that defines management of the zone z1.com by the server nsz1.

The principal lines of this zone file FZ1.zone are set out in appendices 2-1 and 2-2.

As mentioned above, the invention creates sub-zones of the domain z1.com each associated with a pair of signature keys.

A distribution rule is used for this which, in this example, specifies that:

data from sub-zones the first letter of the name of which is from "a" to "m" must be signed by a first pair of keys; and data from sub-zones the first letter of the name of which is from "n" to "z" must be signed by a second pair of keys.

In the embodiment described here, a KEY field is used for this (see line L10), as this is the first information required by the DNSSEC client CL1.

In the example described here, the "ALGO" and "TYPE" fields of the KEY field are used to establish that it is a question of a distribution of keys.

In this way, the client CL1 is directly informed of the presence of a distribution rule.

A new type could be used instead.

Note that in line L10 of appendix 2-1, the type KEY is followed by a reference number to distinguish the key type. The value 230 is used here, which has not yet been allocated. The subsequent fields are the "Protocol" and "Algorithm" fields. A value can be agreed on that signifies that they must not be taken into account, or specifying the nature of the field (domain name, argument, and so on).

L10 indicates a reference to the distribution rule of the domain. Note that this reference can be used in a number of ways in the NAPTR fields. Thus is can be assumed that the rule is referenced by a domain name, as in the following example:

Kr IN NAPTR 101 50 " " "srv" "!^[a-m]!key.z1.com", or that the rule is referenced as the argument of a function indicated in the service field:

IN NAPTR 101 50 " " "srv!kr!" "!^[a-m]
!key.z1.com", or referenced in the regexp field:

IN NAPTR 101 50 " " "srv" "!^[a-m]!kr:key.z1.com".

These choices are independent of the invention and can be determined by standardization bodies or by custom.

Be this as it may, the KEY field must include an indication that the key is not directly in its fields, and that a query must be submitted to another domain, namely the domain kr.z1.com in this example (see line L10).

Placing a reference other than a key in a KEY field is characteristic of a zone file of the invention.

In the example described here, the distribution rule is given in lines L13 to L15 of the field FZ1.zone.

In this example, the first field NAPTR (line L13) indicates that the distribution rule does not apply to the field kr. To apply it first to the domain name, a higher order (101) is placed on this rule.

Indicating directly the value of the key KSK of the partition or of the identifier of the key can equally be envisaged.

Thus in the present example the information relating to the whole of the domain is either kr.z1.com or z1.com.

The rest of the set of domain names beginning with one letter is managed within its own sub-group.

Alternatively, a set of three keys KEY1, KEY2, and KEY3 could be indicated in the "order" and "preference" fields of NAPTR-type data and the client told to use KEY1 first, then KEY2, then KEY3. In this distribution rule, the field NAPTR is filled in from the field "srv" which indicates that the data referred relates to the distribution service.

The "FLAG" field must for example be set to "DS" to indicate that the next query relates to a DS field. This eliminates all ambiguity as to the interpretation of the data hosted under the NAPTR-type fields.

Moreover, the field DS must include in its "TYPE" or "ALGO" fields an indication of delegation to a partition and not to a sub-domain (see lines L17 and L18).

In the preferred embodiment described here, in the step E30, the processor means 10 of the server nsz1 interpret the regular expressions of the lines L13 to L15 to obtain, from the domain name machine.z1.com, the pair of keys KSK_p1/ZSK_p1 of which the private components were used to sign the data RR DATA of this sub-zone.

During a step E40 the processing means 10 of the server nsz1 obtain information for identifying the pair of keys.

This information can be of various types.

For example, it can include the distribution rule (L13-L15) and the reference to the distribution rule contained in the KEY field of the line L10.

A response including the information obtained during the steps E30 and E40 is sent by the name server nsz1 to the client CL1 during a step E50.

The client CL1 receives this response during a step F20.

For example, the response to the above dig query can take the following form:

```
; <<>> dig 9.3.1 <<>> machine.z1.com
;; global options: printcmd
;; Got answer:
;; ->>HEADER<<- opcode: QUERY, status: NOERROR, id:
61020;; flags: qr rd ra; QUERY: 1, ANSWER: 5, AUTHORITY:
4, ADDITIONAL: 3
;; QUESTION SECTION:
;machine.z1.com.              IN      A
;; ANSWER SECTION:
machine.z1.com               IN      A       10.193.161.74
;; AUTHORITY SECTION:
z1.com.             2910    IN      NS      nsz1.net.
;; ADDITIONAL SECTION:
nsz1.net.           281     IN      A       213.193.20.11
        IN      KEY     230             x       x       [kr.z1.com];
        IN      KEY     256             3       5       [...]   ; key id ZSK_com
        IN      KEY     257             3       5       [...]   ; key id KSK_com
        IN      SIG     KEY     (ZSK_com)       [...]   #signed with KSK_com
        IN      SIG     KEY     (KSK_com)       [...]   #signed with ZSK_com
Kr      IN      NAPTR   101     50      """     "srv"   "!^[kr|NULL].z1.com.!.z1.com"
        IN      NAPTR   100     50      "DS"    "srv"   "!^[a-m].z1.com.!a-keys-p1.z1.com"
        IN      NAPTR   100     50      "DS"    "srv"   "!^[n-z].z1.com.!n-keys-p1.z1.com"
        IN      SIG     NAPTR   [...]                   #signed with ZSK_z1
        IN      DS      id_KSK_p1 [...]                 #hash of KSK for partition p1 of z1
        IN      DS      id_KSK_p2 [...]                 #hash of KSK for partition p2 of z1
        IN      SIG     DS [...]                        #signed with ZSK_z1
```

-continued

| | | | | | | |
|---|---|---|---|---|---|---|
| a-keys-p1 | IN | KEY | 256 | 3 | 5 | [...] ; key id_ZSK_p1 |
| a-keys-p1 | IN | KEY | 257 | 3 | 5 | [...] ; key id_KSK_p1 |
| a-keys-p1 | IN | SIG | KEY (id_ZSK_p1) | [...] | | #signed with KSK_p1 |
| a-keys-p1 | IN | SIG | KEY (id_KSK_p1) | [...] | | #signed with ZSK_p1 |

;; Query time: 33 msec
;; SERVER: 10.193.117.254#53(10.193.117.254)
;; WHEN: Fri Apr 22 18:30:00 2005
;; MSG SIZE rcvd:304

In the preferred implementation described, and where appropriate, the processor means 20 of the client device CL1 interpret the distribution rule L13 to L15 contained in the response (step F30).

Here, as a result of this interpretation, the client device CL1 determines that the pair of keys used to sign the IP address of the domain machine.z1.com is the pair ZSK_p1/KSK_p1.

Be this as it may, on receiving a query relating to the area z1.com, the client CL1 must be informed of the presence of a partition.

To this end, either the client CL1 submits a query to the domain "z1.com" using the type ANY or the server, either the server sends, on receiving a domain name "machine.z1.com", a response including an additional field with the data NS, KEY, NAPTR linked to the distribution rule DS, and where applicable the various partition keys.

This data is optional on each occasion, but this approach avoids numerous queries.

In the example described here, the distribution rule takes the form of a regular expression, but other rules can be used, for example rules that do not apply only to the syntax of the domain name.

Note finally that the distribution rule can be localized in another domain.

APPENDIX 1

```
// Zone file of domain .com
// FCOM.zone
$TTL         86400                                                              //L1
$ORIGIN      com.                                                               //L2
IN    SOA    localhost.root.localhost {                                         //L3
             }                                                                  //L4
IN    SIG    SOA [...]            //signed with ZSK_com                         //L5
IN    NS     nscom.net                                                          //L6
IN    SIG    NS [...]             //signed with ZSK_com                         //L7
IN    KEY    256    3        5      [...]    //  key id ZSK_com                 //L8
IN    KEY    257    3        5      [...]    //  key id KSK_com                 //L9
IN    SIG    KEY    [...]       (ZSK_com)    //  sign of records of             //L10
                                                 type KEY with ZSK_com
IN    SIG    KEY    [...]       (KSK_com)    //  sign of records of             //L11
                                                 type KEY with KSK_com
      // RR DATA signed with ZSK_com
      z1       IN    NS      nsz1.z1.com                                        //L12
               IN    SIG     NS [...]     //signed with ZSK_com                 //L13
      nsz1.z1  IN    A       10.193.161.73                                      //L14
               IN    SIG     A     [...]  //signed with ZSK_com                 //L15
IN DS [KSK_z1]         [...]       //hash of child KSK (KSK_z1)                 //L16
IN SIG DS              [...]       //signed with ZSK_com                        //L17
```

APPENDIX 2-1

```
// Zone file of domain z1.com
// FZ1.zone
$TTL         86400                                                              //L1
$ORIGIN      z1.com.                                                            //L2
IN    SOA    localhost.root.localhost {                                         //L3
             }                                                                  //L4
IN    SIG    SOA [...]       //signed with ZSK_z1                               //L5
IN    NS     nsz1.z1.com                                                        //L6
IN    SIG    NS [...]        //signed with ZSK_z1                               //L7
  IN         KEY 256    3         5           [...]    // ZSK_z1                //L8
  IN         KEY 257    3         5           [...]    // KSK_z1                //L9
  IN         KEY 230    x         x           [kr.z1.com]                       //L10
IN    SIG    KEY   [...] ZSK_z1   //signed with KSK_z1                          //L11
IN    SIG    KEY   [...] KSK_z1   //signed with ZSK_z1                          //L12
  kr         IN NAPTR 101 50 ""        "srv"   "! [kr|NULL].z1.com.!.z1.com"    //L13
             IN NAPTR 100 50 "DS"      "srv"   "! [a-m].z1.com.!a-keys-p1.z1.com" //L14
             IN NAPTR 100 50 "DS"      "srv"   "! [n-z].z1.com.!n-keys-p1.z1.com" //L15
             IN SIG NAPTR [...]        //signed with ZSK_z1                     //L16
IN DS [KSK_p1] [...]       //hash of KSK for partition p1 of z1                 //L17
IN  DS [KSK_p2] [...]      //hash of KSK for partition p2 of z1                 //L18
IN  SIG DS [...]           //signed with ZSK_z1                                 //L19
```

APPENDIX 2-2

```
//continuation of FZ1.zone
// Partition p1
a-keys-p1      IN KEY   256      3    5    [...]              // key id_ZSK_p1           //L20
a-keys-p1      IN KEY   257      3    5    [...]              // key id_KSK_p1           //L21
a-keys-p1      IN SIG   KEY      [...]     ZSK_p1   //signed with KSK_p1                 //L22
a-keys-p1      IN SIG   KEY      [...]     KSK_p1   //signed with ZSK_p1                 //L23
               //RR DATA signed with ZSK_p1                                              //L24
machine        IN A     10.193.161.74                                                    //L25
               IN SIG   A        [...]     //signed with ZSK_p1                          //L26
// Partition p2
n-keys-p2      IN KEY   256      3    5    [...]              // key id_ZSK_p2           //L27
n-keys-p2      IN KEY   257      3    5    [...]              // key id_KSK_p2           //L28
n-keys-p2      IN SIG   KEY      [...]     ZSK_p2   //signed with KSK_p2                 //L29
n-keys-p2      IN SIG   KEY      [...]     KSK_p2   //signed with ZSK_p2                 //L30
               //RR DATA signed with ZSK_p2                                              //L31
               [...]
```

The invention claimed is:

1. A server of a domain in a telecommunications network, configured to manage domain name system security extension (DNSSEC) queries relating to said domain, including means for receiving from a client device a query seeking DNS data of that domain, said server comprising:
    a zone file including one or more distribution rules defining a partitioning of said domain into a plurality of sub-zones, DNS data of each sub-zone being associated with a pair of keys comprising partition keys specific to said sub-zone;
    means for obtaining from said zone file, a piece of useful information sufficient to identify a partition key pair associated with required DNS data; and
    means for sending said client device, in response to said query, said required DNS data, a value of a signature of the DNS data produced using a private component of said associated partition key pair, and said piece of useful information.

2. The server according to claim 1, wherein said useful piece of information includes at least one of a public component of said associated partition key pair and said one or more distribution rules with public components of all the partition keys.

3. The server according to claim 1, wherein said one or more distribution rules comprise a regular expression for obtaining a public component of said associated partition key pair.

4. A non-transitory computer file executing on a server of a domain in a telecommunications network which, when used on a computer apparatus, causes the server to manage domain name system security extension (DNSSEC) queries relating to said domain in the telecommunication network, the computer file comprising:
    program code for one or more distribution rules defining a partitioning of said domain into a plurality of sub-zones, DNS data of each sub-zone of said plurality of sub-zones being associated with a pair of keys comprising partition keys specific to said sub-zone, said one or more distribution rules enabling the computer apparatus to obtain a useful piece of information sufficient to identify which partition key pair is associated with any data selected from DNS data of the domain.

5. A method of managing domain name system security extension (DNSSEC) queries relating to a domain in a telecommunications network, comprising:
    receiving, from a client device, a query seeking DNS data from the domain;
    reading a zone file containing one or more distribution rules defining a partitioning of said domain into a plurality of sub-zones, DNS data of each sub-zone being associated with a pair of keys comprising partition keys specific to said sub-zone;
    obtaining from said zone file, a useful piece of information sufficient to identify a partition key pair associated with required DNS data; and
    sending said client device, in response to said query, said required DNS data, a value of a signature of DNS data produced using a private component of said associated partition key pair and said useful piece of information.

6. The method according to claim 5 for managing DNSSEC queries, wherein said information includes a public component of said associated partition key pair and said one or more distribution rules with public components of all the partition keys.

7. A non-transitory computer program executing on a processor which, when used on a computer apparatus, causes management of domain name system security extension (DNSSEC) queries relating to a domain in a telecommunication network, the computer program comprising:
    program code for receiving, from a client device, a query seeking DNS data from the domain;
    program code for reading a zone file containing one or more distribution rules defining a partitioning of said domain into a plurality of sub-zones, DNS data of each sub-zone being associated with a pair of keys comprising partition keys specific to said sub-zone;
    program code for obtaining from said zone file, a useful piece of information sufficient to identify a partition key pair associated with required DNS data; and
    program code for sending said client device, in response to said query, said required DNS data, a value of signature of DNS data produced using a private component of said associated partition key pair and said useful piece of information;
    wherein said information includes a public component of said associated partition key pair and said one or more distribution rules with public components of all the partition keys.

8. A non-transitory computer-readable storage medium encoded with a computer program executed by a computer that causes management of domain name system security extension (DNSSEC) queries relating to a domain in a telecommunications network, the computer program comprising:
    program code for receiving, from a client device, a query seeking DNS data from the domain;
    program code for reading a zone file containing one or more distribution rules defining a partitioning of said domain into a plurality of sub-zones, DNS data of each sub-zone being associated with a pair of keys comprising partition keys specific to said sub-zone;

program code for obtaining from said zone file, a useful piece of information sufficient to identify a partition key pair associated with required DNS data; and program code for sending said client device, in response to said query, said required DNS data, a value of a signature of DNS data produced using a private component of said associated partition key pair and said useful piece of information;

wherein said information includes a public component of said associated partition key pair and said one or more distribution rules with public components of all the partition keys.

9. A data processing system client of a server of domain names in a telecommunications network, comprising:

means for sending said server a domain name system security extension (DNSSEC) query seeking DNS data from the domain;

means for receiving, in response to said query, a useful piece of information including a distribution rule defining a partitioning of said domain into a plurality of sub-zones, DNS data of each sub-zone being associated with a pair of keys comprising a public partition key and a private key; and means for interpreting said useful piece of information to identify said public partition key corresponding to the private key used to sign required DNS data.

10. A method of obtaining DNS data of a domain in a telecommunications network, the method comprising:

sending a domain name system security extension (DNSSEC) query seeking said DNS data;

receiving, in response to said query, a useful piece of information including a distribution rule defining a partitioning of said domain into a plurality of sub-zones, DNS data of each sub-zone being associated with a pair of keys comprising a public partition key and a private key; and interpreting said information to identify said public partition key corresponding to the private key used to sign required DNS data.

11. A non-transitory computer program executing on a processor which, when used on a computer apparatus, causes domain name service (DNS) data to be obtained in a telecommunications network, the computer program comprising:

program code for sending a domain name system security extension (DNSSEC) query seeking said DNS data;

program code for receiving, in response to said query, a useful piece of information including a distribution rule defining a partitioning of said domain into a plurality of sub-zones, DNS data of each sub-zone being associated with a pair of keys comprising a public partition key and a private key; and program code for interpreting said information to identify said public partition key corresponding to the private key used to sign required DNS data.

12. A non-transitory computer-readable storage medium encoded with a computer program executed by a processor that causes domain name system (DNS) data to be obtained in a telecommunications network, the computer program comprising:

program code for sending a domain name system security extension (DNSSEC) query seeking said DNS data;

program code for receiving, in response to said query, a useful piece of information including a distribution rule defining a partitioning of said domain into a plurality of sub-zones, DNS data of each sub-zone being associated with a pair of keys comprising a public partition key and a private key; and program code for interpreting said information to identify said public partition key corresponding to the private key used to sign required DNS data.

13. A non-transitory computer program executing on a processor which, when used on a computer apparatus, causes management of domain name systems security (DNSSEC) queries in a telecommunications network, the computer program comprising:

program code for receiving, from a client device, a query seeking DNS data from the domain;

program code for reading a zone file containing one or more distribution rules defining a partitioning of said domain into a plurality of sub-zones, DNS data of each sub-zone being associated with a pair of keys comprising partition keys specific to said sub-zone;

program code for obtaining from said zone file, a useful piece of information sufficient to identify a partition key pair associated with required DNS data; and program code for sending said client device, in response to said query, said required DNS data, a value of a signature of DNS data produced using a private component of said associated partition key pair and said useful piece of information.

14. A non-transitory computer-readable storage medium encoded with a computer program executed by a computer that causes management of domain name system security (DNSSEC) queries in a telecommunications network, the computer program comprising:

program code for receiving, from a client device, a query seeking DNS data from the domain;

program code for reading a zone file containing one or more distribution rules defining a partitioning of said domain into a plurality of sub-zones, DNS data of each sub-zone being associated with a pair of keys comprising partition keys specific to said sub-zone;

program code for obtaining from said zone file, a useful piece of information sufficient to identify a partition key pair associated with required DNS data; and program code for sending said client device, in response to said query, said required DNS data, a value of a signature of DNS data produced using a private component of said associated partition key pair and said useful piece of information.

* * * * *